(12) United States Patent
Lee (10) Patent No.: US 11,344,395 B2
(45) Date of Patent: May 31, 2022

(54) ELECTRICALLY DRIVEN TOOTHBRUSH

(71) Applicant: Shummi Enterprise Co., Ltd., Taipei (TW)

(72) Inventor: Chia-Lin Lee, Taipei (TW)

(73) Assignee: SHUMMI ENTERPRISE CO., LTD., Taipei (TW)

( * ) Notice: Subject to any disclaimer, the term of this patent is extended or adjusted under 35 U.S.C. 154(b) by 529 days.

(21) Appl. No.: 16/419,357

(22) Filed: May 22, 2019

(65) Prior Publication Data
US 2020/0368002 A1  Nov. 26, 2020

(51) Int. Cl.
*A61C 17/22* (2006.01)
*A61C 17/34* (2006.01)
*F16J 15/32* (2016.01)

(52) U.S. Cl.
CPC .......... *A61C 17/222* (2013.01); *A61C 17/225* (2013.01); *F16J 15/32* (2013.01)

(58) Field of Classification Search
CPC ... A61C 17/222; A61C 17/225; A61C 17/221; A61C 17/34; F16J 15/32
See application file for complete search history.

(56) References Cited

U.S. PATENT DOCUMENTS

| | | | | |
|---|---|---|---|---|
| 5,590,434 A | * | 1/1997 | Imai ................... | A61C 17/3481 15/22.1 |
| 2005/0050659 A1 | * | 3/2005 | Chan .................. | A61C 17/22 15/22.1 |
| 2007/0192976 A1 | * | 8/2007 | Gatzemeyer ....... | A46B 15/0008 15/105 |
| 2009/0229062 A1 | * | 9/2009 | Filby ................... | A46B 9/045 15/22.1 |

(Continued)

FOREIGN PATENT DOCUMENTS

| CN | 1116082 A | 2/1996 |
|---|---|---|
| CN | 203677288 U | 7/2014 |

(Continued)

OTHER PUBLICATIONS

Search Report of CN Application No. 201910564141.9, dated Jun. 17, 2021, 8 pages.

*Primary Examiner* — Weilun Lo
(74) *Attorney, Agent, or Firm* — Muncy, Geissler, Olds & Lowe, P.C.

(57) ABSTRACT

An electrically driven toothbrush is provided, comprising a hollow handle having a first end provided with a tooth brushing portion and a second end provided with an opening. An electrical assembly module is inserted into the hollow handle through the opening and provides power to turn on the toothbrush. A conductive elastic piece is fitted with the electrical assembly module and contacts with an electrical fixture. A cap member is removably attached to the hollow handle for encapsulation. At least one trigger portion is provided on one side of the cap member. When the trigger portion contacts with the conductive elastic piece, the conductive elastic piece deforms and touches with the electrical fixture to form an electrical loop with the electrical assembly module to generate power for turning on the proposed toothbrush. By designing above, it successfully achieves purposes of improving and enhancing the conveniences of use for users.

8 Claims, 8 Drawing Sheets

(56) References Cited

U.S. PATENT DOCUMENTS

| | | | | |
|---|---|---|---|---|
| 2010/0071142 | A1* | 3/2010 | Boll | A61C 17/221 |
| | | | | 15/22.1 |
| 2014/0352088 | A1* | 12/2014 | Wu | A61C 17/3436 |
| | | | | 15/22.1 |
| 2017/0360539 | A1* | 12/2017 | Luo | A46B 15/0044 |
| 2018/0125624 | A1* | 5/2018 | Tweedie | A61C 17/221 |
| 2019/0008620 | A1* | 1/2019 | Greer, Jr. | A46B 15/0044 |

FOREIGN PATENT DOCUMENTS

| | | |
|---|---|---|
| CN | 204970027 U | 1/2016 |
| EP | 2941145 A1 | 11/2015 |
| GB | 951148 A | 3/1964 |

* cited by examiner

ELECTRICALLY DRIVEN TOOTHBRUSH

BACKGROUND OF THE INVENTION

Field of the Invention

The present invention relates to a toothbrush structure, and more particularly to an electrically power driven toothbrush structure.

Description of the Prior Art

Toothbrush structures have been widely utilized in a variety of consumers' daily lives, and have been especially developed for the purpose of achieving a reduction in time for brushing a user's teeth. And therefore, as compared with manually operated toothbrushes, power-driven toothbrush structures have been making such improvements in convenience of use in those fields.

Typically, such power-driven toothbrush structures generally comprise a conversion type of toothbrush and a vibration type of toothbrush. The conversion type of toothbrush has an electrically operated motor disposed inside its main body so as to generate a revolving force, and further resulting in a revolving force-converting mechanism disposed therein for changing the revolving force into, e.g., either a rolling motion or a sliding motion.

In another aspect, the vibration type of toothbrush has an eccentric weight attached to the electrically operated motor. Either type of the above mentioned toothbrush structures is a hygienic appliance in which its tooth brushing portion is positioned at front end of the toothbrush main body for contacting with the user's teeth so as to brush the teeth surface and to protect the teeth and the gums against cavities.

As for the typical electrically driven toothbrush structure, it usually allows the tooth brushing portion constructed to be able to be removed from its handle portion such that the tooth brushing portion can be replaceable. However, in the assembly process of the toothbrush structure, mounting mechanisms having complicated structures are usually used for instance, when the tooth brushing portion or the motor is mounted to or into the handle portion, or when a dry cell or charging battery is attached to the handle portion. Moreover, the mounting mechanisms will probably get loose from time to time along with the assembly of the toothbrush. Alternatively, the dry cell or charging battery cannot be always positively retained within the toothbrush. Replacements of the dry cells or charging batteries are always necessary and thus consume a great amount of time and efforts. All of these result in inconveniences in the electrically driven toothbrush structures when being used, and in particular, in the above mentioned mounting mechanisms, which for now are known as being costly and difficult to manufacture.

On account of above, a variety of prior arts have made enormous efforts on improving and enhancing the conveniences of use for the electrically driven toothbrush structures. Nevertheless, it is believed that so far those achievements are still limited and cannot be utilized extensively. Therefore, in view of all, to overcome the above mentioned problems, it should be obvious that there is indeed an urgent need for the professionals in the field for a novel and inventive electrically driven toothbrush structure to be developed that can effectively solve those above mentioned problems occurring in the prior design.

SUMMARY OF THE INVENTION

In order to overcome the above mentioned disadvantages, one major objective in accordance with the present invention is provided for a novel electrically driven toothbrush structure. By employing the proposed electrically driven toothbrush structure of the present invention, it can be utilized so as to improve and enhance the conveniences of use for the electrically driven toothbrush structures.

For achieving the above mentioned objectives, the present invention provides an electrically driven toothbrush, which comprises a hollow handle having a first end provided with a tooth brushing portion and a second end provided with an opening. An electrical assembly module is configured to be inserted into the hollow handle through the opening of the second end. And, the electrical assembly module provides power output to turn on the electrically driven toothbrush. A conductive elastic piece is configured to have a first end fitting with the electrical assembly module and a second end for contacting with an electrical fixture. A cap member is removably attached to the hollow handle through the opening, forming an accommodation space for disposing the electrical assembly module in electrical connection with the conductive elastic piece inside the hollow handle. At least one trigger portion is provided on one side of the cap member, and when the at least one trigger portion is in contact with the conductive elastic piece, the second end of the conductive elastic piece deforms and touches with the electrical fixture to form an electrical loop with the electrical assembly module so as to generate power for turning on the electrically driven toothbrush.

A seal ring is disposed for sealing a gap between the hollow handle in conjunction with the cap member.

According to one embodiment of the present invention, the seal ring can be designed as an O-shaped ring. The seal ring can be designed as being fitted on a portion of any one of the hollow handle and the cap member at an external edge of a part where the hollow handle meshes with the cap member in order to seal the gap between the hollow handle in conjunction with the cap member.

According to one embodiment of the present invention, the electrical fixture for example, can be a securing arrangement comprising a screw, a fastener, or the like. The electrical assembly module is a printed circuit board assembly (PCBA) or one module having an electrically operated motor disposed alternatively so as to generate a revolving force for turning on the electrically driven toothbrush structure.

Moreover, for engaging mechanisms of the conductive elastic piece onto the electrical assembly module, the electrical assembly module is further provided with a plurality of slots. And, these slots are configured for being engaged with the conductive elastic piece. The conductive elastic piece may further comprise a plurality of protrusions configured on its first end when being engaged. As a result, by such arrangements, the electrical assembly module is able to be fitted with the first end of the conductive elastic piece through the plurality of protrusions and the corresponding slots configuration.

According to a preferred embodiment of the present invention, two trigger portions can be disposed and each trigger portion can be respectively disposed on each side of the cap member for triggering and turning on the proposed electrically driven toothbrush structure. In one embodiment, the trigger portion is selectively formed as a pressing button, knob or the like.

In addition, according to a preferred embodiment of the present invention, the second end of the conductive elastic piece may comprise a circular arc having two opposite extending sides in a longitude distance and a notch formed between the two opposite extending sides of the circular arc.

According to the present invention, the notch, as designed, is configured to accommodate the electrical fixture.

As a result, when the user is about to operate the power driven toothbrush structure, the user presses the trigger portions on the cap member, such that the trigger portions are in contact with the circular arc of the conductive elastic piece, thereby forming a deformation. Under such circumstances, a width of the notch is reduced due to the deformation, and both opposite extending sides of the circular arc of the second end of the conductive elastic piece touch with the electrical fixture to conduct the electrical loop with the electrical assembly module so as to generate power for turning on the proposed electrically driven toothbrush structure.

And thus, by employing the inventive design, it is believed that the proposed electrically driven toothbrush structure of the present invention can be applied and widely utilized so as to improve and enhance the conveniences of use for the consumers' daily lives as well as operated in a much easier manner for the users' daily living habits.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Since there are yet more inconveniences in that the complicated structure of the mounting mechanisms may greatly increase the dimension and weight of the electrically driven toothbrush structures, such a toothbrush is still inconvenient for use.

And also still inconvenience occurs when the electrically driven toothbrush structure is used in combination with any switch of a conventional structure for turning on the power driven toothbrush. More specifically, such switch is mostly designed with a predetermined as well as limited size and configuration merits. In addition, the power driven toothbrush structure, in which the aforesaid switch is to be incorporated, is usually subjected to certain restrictions so as to provide its original design. Based on that, inconsistence or otherwise enforced matching issues arise in respect of dimensions, mechanical systems, or switch design.

In order to solve the foregoing issues, the present invention provides an electrically driven toothbrush. Reference will now be made in detail to the preferred embodiments of the present invention, examples of which are illustrated in the accompanying drawings. Wherever possible, the same reference numbers are used in the drawings and the description to refer to the same or like parts.

The embodiments described below are illustrated to demonstrate the technical contents and characteristics of the present invention and to enable the persons skilled in the art to understand, make, and use the present invention. However, it shall be noticed that, it is not intended to limit the scope of the present invention. Therefore, any equivalent modification or variation according to the spirit of the present invention is to be also included within the scope of the present invention.

Figure 1:
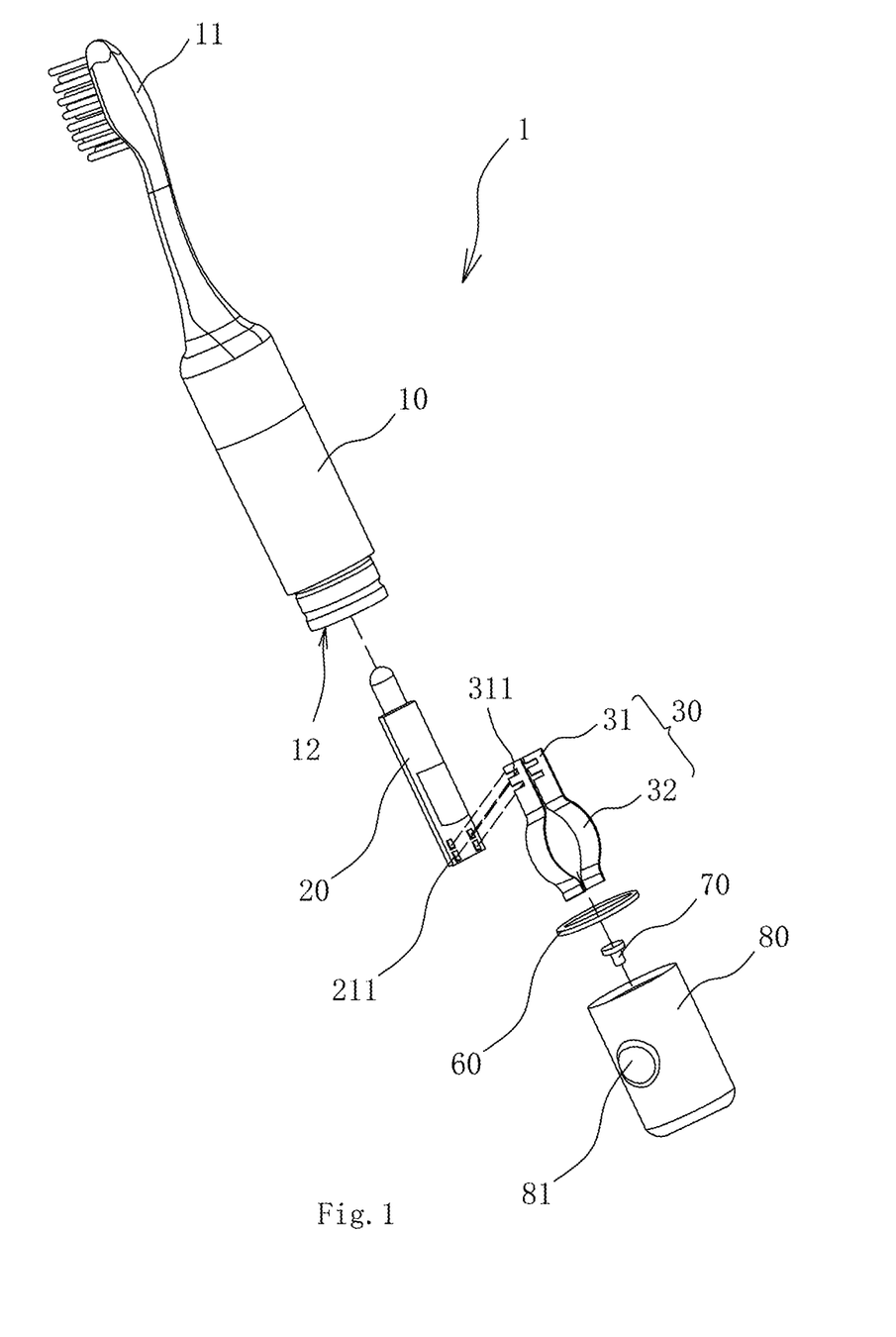
FIG. 1 shows an explosive sectional diagram of an electrically driven toothbrush in accordance with a preferred embodiment of the present invention.
Figure 2:
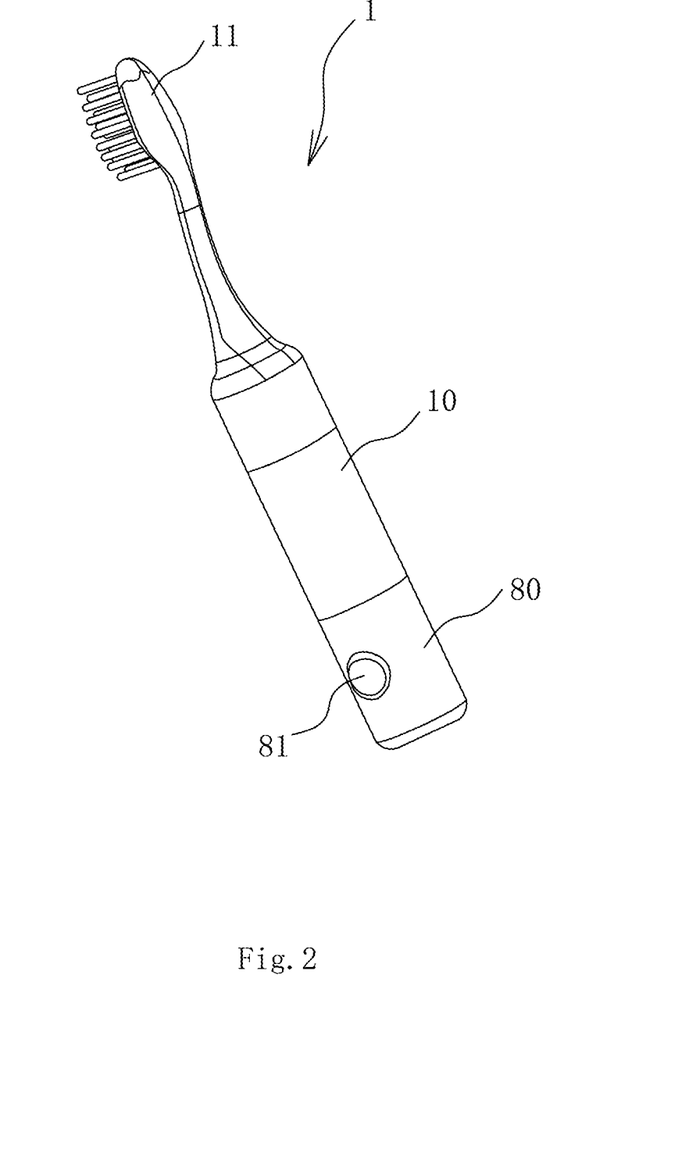
FIG. 2 shows a combination diagram of the components in FIG. 1 of the electrically driven toothbrush of the present invention.

Please refer to FIG. 1, which shows an explosive sectional diagram of an electrically driven toothbrush in accordance with a preferred embodiment of the present invention. FIG. 2 shows a combination diagram of the components in FIG. 1 of the electrically driven toothbrush of the present invention. As shown in the figures, the electrically driven toothbrush 1 of the present invention comprises a hollow handle 10 having a first end provided with a tooth brushing portion 11 and a second end provided with an opening 12. The first end of the hollow handle 10 and the second end of the hollow handle 10 are opposite ends. The second end of the hollow handle 10 is open for providing an accommodation space for disposing electrical or mounting components there inside.

Figure 3:
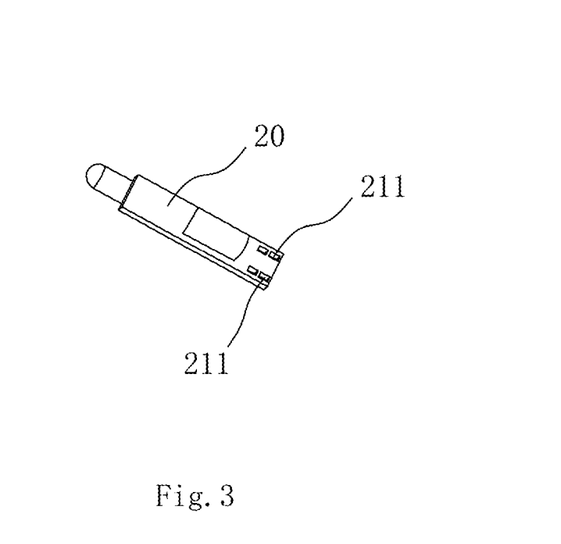
FIG. 3 shows a structural diagram of an electrical assembly module in accordance with a preferred embodiment of the present invention.

FIG. 3 shows a structural diagram of an electrical assembly module 20 in accordance with a preferred embodiment of the present invention. As shown in FIG. 3, the electrical assembly module 20 is provided with a plurality of slots 211. And, these slots 211 are configured for being engaged with a conductive elastic piece shown in FIG. 4.

Figure 4:
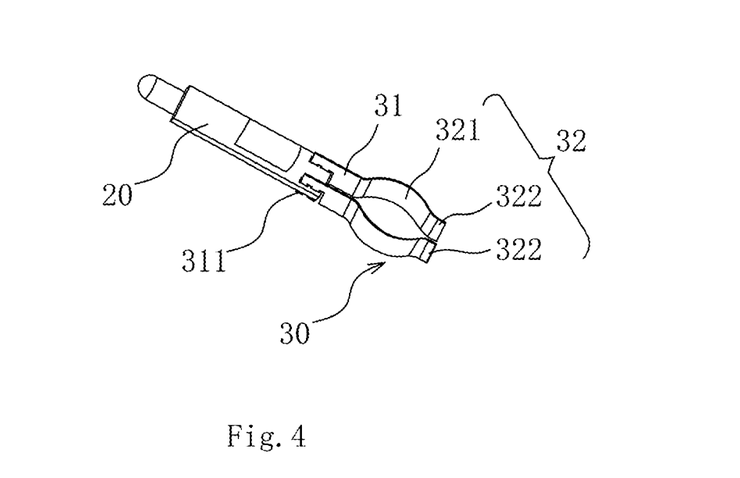
FIG. 4 shows a structural diagram of how the electrical assembly module fitting with the conductive elastic piece in accordance with a preferred embodiment of the present invention.

Please refer to FIG. 4, which shows a structural diagram of how the electrical assembly module 20 fitting with the conductive elastic piece 30 in accordance with a preferred embodiment of the present invention. For detailed configurations, please find referring with respect in together with FIG. 1 and FIG. 3. The conductive elastic piece 30 comprises a plurality of protrusions 311 configured on a first end 31 of the conductive elastic piece 30. As such, the electrical assembly module 20 is able to be fitted with the first end 31 of the conductive elastic piece 30 through the plurality of protrusions 311 configurations which are inserted or plugged into the corresponding slots 211 of the electrical assembly module 20 as shown in FIG. 4. By meshing the plurality of protrusions 311 of the conductive elastic piece 30 with the corresponding slots 211 of the electrical assembly module 20, FIG. 4 explains well how these two, i.e. the conductive elastic piece 30 and the electrical assembly module 20, are fitted to each other.

Figure 5:
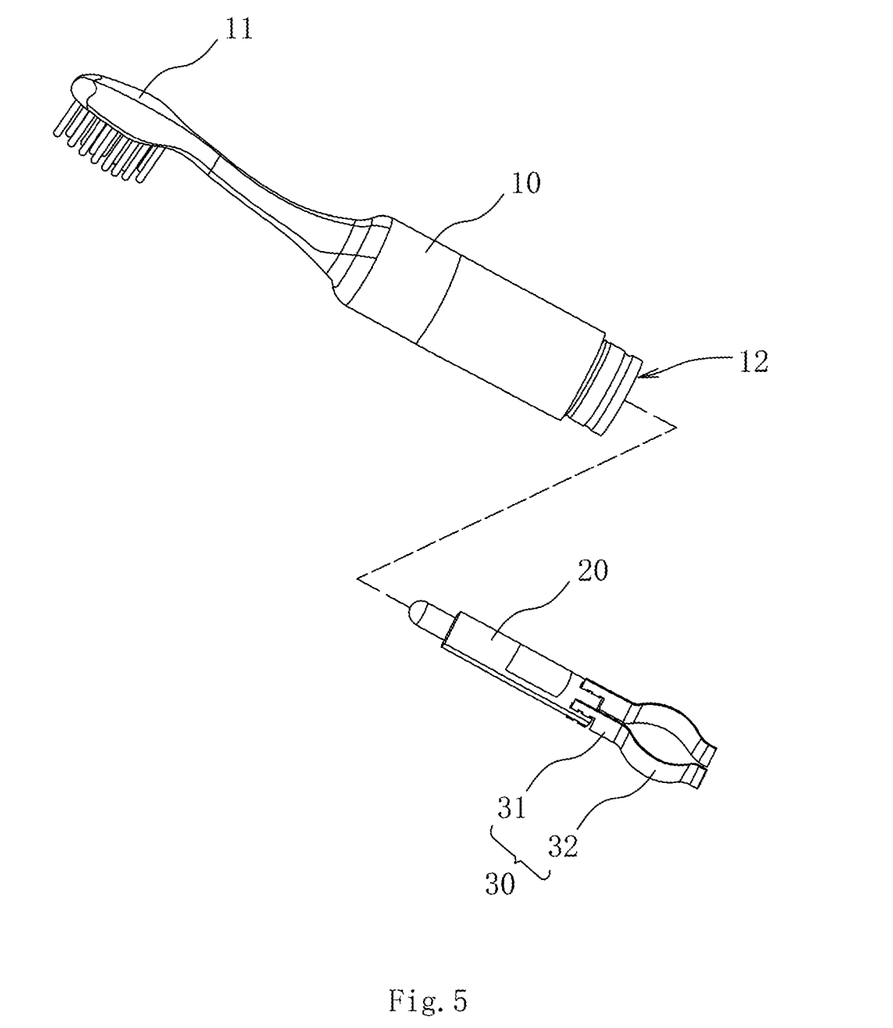
FIG. 5 shows a structural diagram of how the electrical assembly module fitting with the conductive elastic piece configured to be inserted into the hollow handle in accordance with a preferred embodiment of the present invention.

Subsequently, please refer to FIG. 5. The electrical assembly module 20 in combination with the conductive elastic piece 30 is configured to be inserted into the hollow handle 10 through the opening 12 of the second end and provides power output to turn on the electrically driven toothbrush 1. According to the embodiment of the present invention, the electrical assembly module 20 can be a printed circuit board assembly (PCBA) or one module having an electrically operated motor disposed alternatively so as to generate a revolving force for turning on the electrically driven toothbrush structure. As a result, when an electrical loop with the electrical assembly module 20 is established and generates power to turn on the electrically driven toothbrush 1, the tooth brushing portion 11 is activated to vibrate and brush the user's teeth surface and to protect the teeth and the gums against dental plagues.

Figure 6:
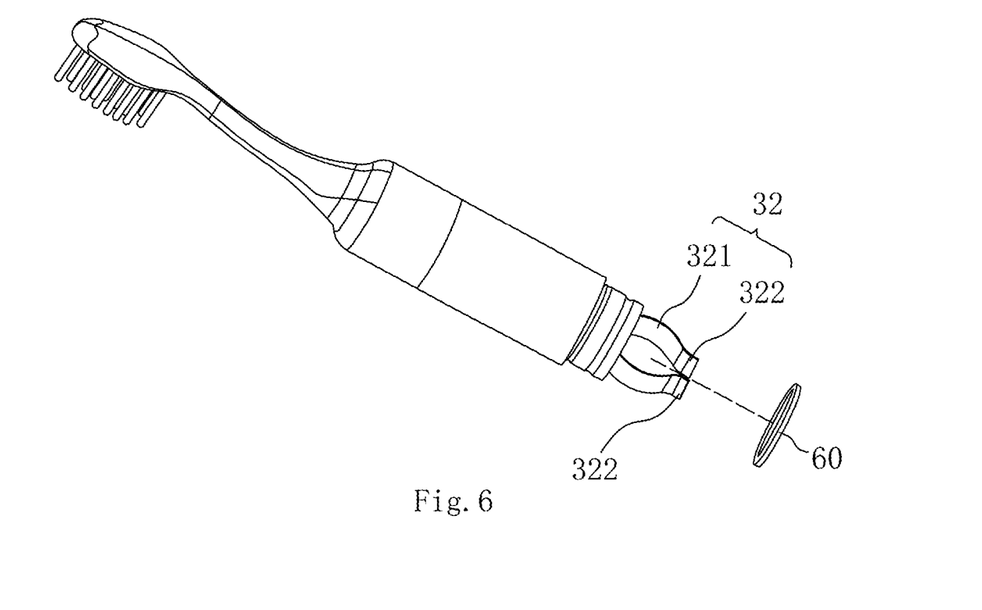
FIG. 6 shows a structural diagram of a seal ring to be fitted at an external edge of a part where the hollow handle meshes with the cap member in accordance with a preferred embodiment of the present invention.
Figure 7:
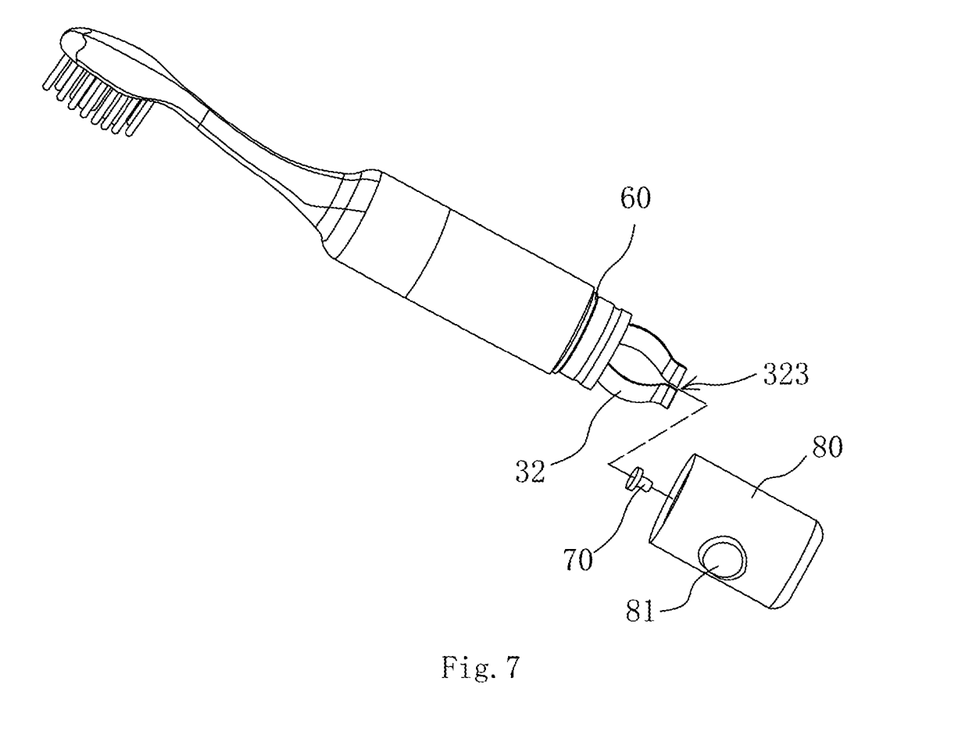
FIG. 7 shows an assembly diagram of an electrically driven toothbrush structure in accordance with a preferred embodiment of the present invention.

Furthermore, please refer to FIG. 4, 6 and FIG. 7. The conductive elastic piece 30 further comprises a second end 32 which is opposite to the first end 31. The second end 32 of the conductive elastic piece 30 is configured for contacting with an electrical fixture 70. According to the preferred embodiment of the present invention, the electrical fixture 70 can be a securing arrangement comprising a screw, a fastener, or the like. In order to demonstrate the techniques of the present invention, a screw is merely shown as an exemplary embodiment but not intended to limit the scope of the present invention.

The second end 32 of the conductive elastic piece 30 comprises a circular arc 321 having two opposite extending sides 322 in a longitude distance and a notch 323 formed between the two opposite extending sides 322 of the circular arc 321. The notch 323 is configured to accommodate the electrical fixture 70.

As shown in FIG. 1, 2 and FIG. 7, a cap member 80 is removably attached to the hollow handle 10 through the opening 12, forming an accommodation space for disposing the electrical assembly module 20 in electrical connection with the conductive elastic piece 30 inside the hollow handle 10. At least one trigger portion 81 is provided on one side of the cap member 80 so as to switch on the electrically driven toothbrush. According to one embodiment of the present invention, the trigger portion 81 can be selectively formed as a pressing button, a knob or the like for a user to control a on and/or off state of the power driven toothbrush structure.

A seal ring 60 is disposed and fitted on a portion of any one of the hollow handle 10 and the cap member 80 at an external edge of a part where the hollow handle 10 meshes with the cap member 80. According to the preferred embodiment of the present invention, the seal ring 60 can be an O-shaped ring as shown in FIG. 6. And with referring to FIG. 7, the seal ring 60 is configured for sealing a gap between the hollow handle 10 in conjunction with the cap member 80, thus completing packaging the foregoing components for composing the electrically driven toothbrush structure 1 of the present invention.

Figure 8:
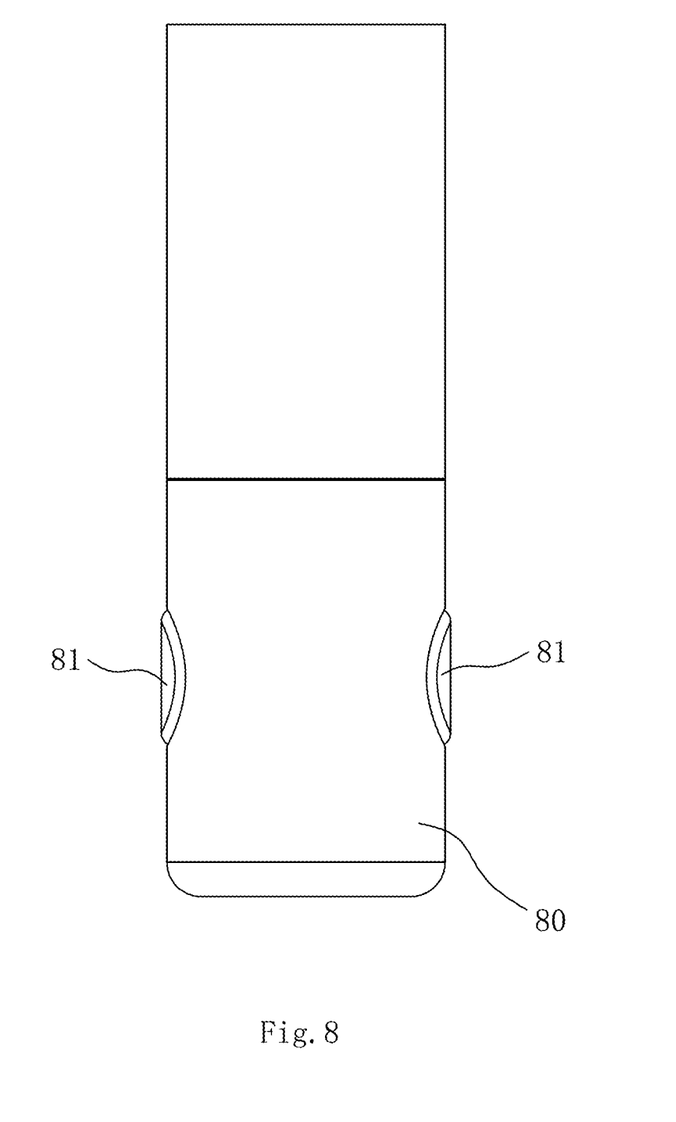
FIG. 8 shows an enlarged view of the cap member of the electrically driven toothbrush in accordance with a preferred embodiment of the present invention.
Figure 9:
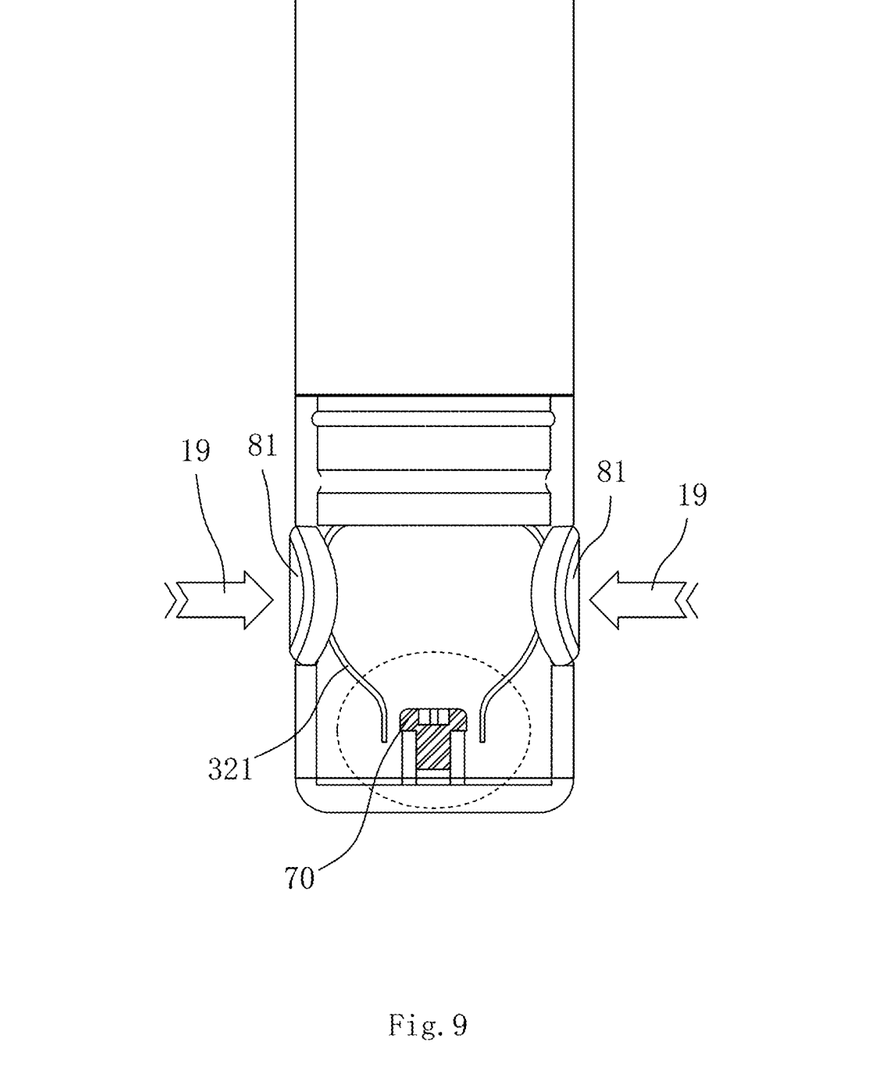
FIG. 9 shows a diagram of FIG. 8 when a user symmetrically presses the trigger portions upon by his or her fingers.

FIG. 8 shows an enlarged view of the cap member of the electrically driven toothbrush in accordance with a preferred embodiment of the present invention. As shown, two trigger portions 81 can be disposed and each trigger portion 81 is respectively configured on each side of the cap member 80 for a user to symmetrically press upon by his or her fingers 19 as shown in FIG. 9 for the purpose of switching on the electrically driven toothbrush structure. Under such a circumstance, when the user presses the trigger portions 81 on the cap member 80 by his or her fingers 19, the trigger portions 81 will get in contact with the circular arc 321 of the conductive elastic piece 30, thus forming a deformation.

Figure 10:
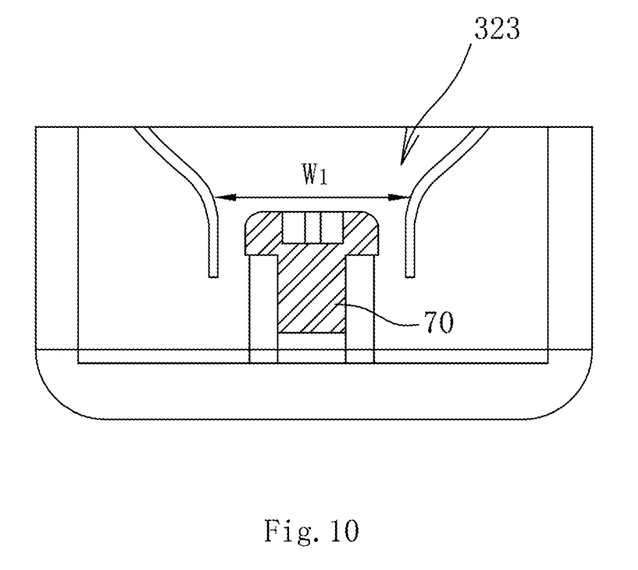
FIG. 10 shows an enlarged diagram of the dotted line indicated in FIG. 9 before the user presses the trigger portions.

FIG. 10 shows an enlarged diagram of the dotted line indicated in FIG. 9. As shown, before the user presses the trigger portions 81, the notch 323 has an original width $W_1$.

Figure 11:
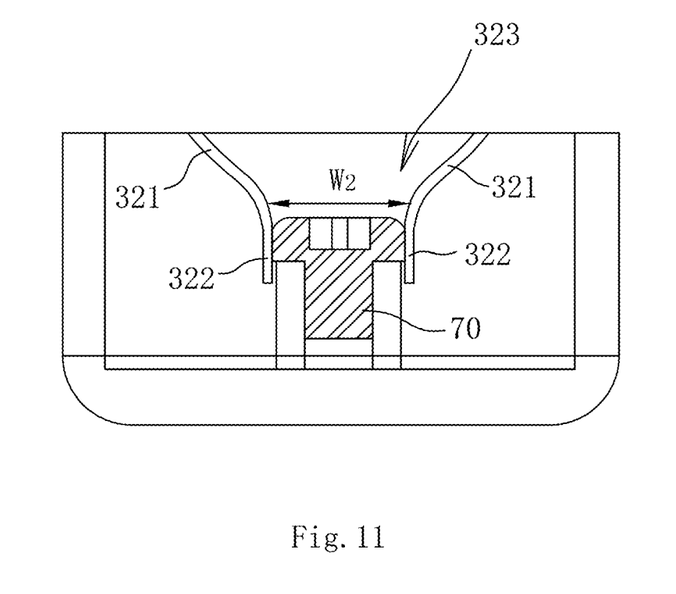
FIG. 11 shows an enlarged diagram of the dotted line indicated in FIG. 9 after the user presses the trigger portions.

FIG. 11 shows an enlarged diagram of the dotted line indicated in FIG. 9 after the user presses the trigger portions. It is apparent that, after the trigger portions 81 are pressed against by the user, a width of the notch 323 is reduced from $W_1$ to $W_2$ due to the deformation caused by the circular arc 321 of the conductive elastic piece 30. At this time, both opposite extending sides 322 of the conductive elastic piece 30 make contact with the electrical fixture 70 so as to form an electrical loop, which is leading to the electrical assembly module 20 and thus providing electrical power to turn on the electrically driven toothbrush 1. As a result, the tooth brushing portion 11 of the electrically driven toothbrush 1 can be successfully activated and perform predetermined cleaning process as designed.

Therefore, to sum up, it is obvious that the present invention indeed provides a novel and inventive electrically driven toothbrush structure which has never been seen or proposed ever before. The proposed invention employs the trigger portions configured on both sides of the cap member so as to trigger and switch on the power driven toothbrush. As such, when a user presses the trigger portions, the conductive elastic piece within the hollow handle of the toothbrush is deformed against the user's action, and thus such the deformation of the conductive elastic piece results in a smaller width of its notch, forcing the conductive elastic piece in contact with the electrical fixture. At this time, it successfully forms an electrical loop to the electrical assembly module for generating power to turn on the electrically driven toothbrush structure. Nevertheless, the present invention is certainly not limited thereto. For people skilled in the art having understandings and technical solutions to the present invention, various modifications and changes are allowed to be followed without departing from the scope of the invention and yet still fall into the invention scope of the present application.

As compared to the prior design, it is proved that the proposed electrically driven toothbrush structure is advantageous of not only fair conveniences in use and low fabrication cost, but also less complexity and maintenance consuming. Thus, it is believed that the present invention structure is instinct, effective and highly competitive for a variety of field applications developed in the future and shall be patentable as well.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. An electrically driven toothbrush, comprising:

a hollow handle having a first end provided with a tooth brushing portion and a second end provided with an opening;

an electrical assembly module providing power output to turn on said electrically driven toothbrush, and configured to be inserted into said hollow handle through said opening of said second end;

a conductive elastic piece having a first end fitting with said electrical assembly module and a second end for contacting with an electrical fixture;

a cap member which is removably attached to said hollow handle through said opening, forming an accommodation space for disposing said electrical assembly module in electrical connection with said conductive elastic piece inside said hollow handle, wherein there are two trigger portions each respectively disposed on each side of said cap member, when said two trigger portions are in contact with said conductive elastic piece, said second end of said conductive elastic piece deforms and touches with said electrical fixture to form an electrical loop with said electrical assembly module to generate power for turning on said electrically driven toothbrush; and a seal ring for sealing a gap between said hollow handle in conjunction with said cap member, wherein said second end of said conductive elastic piece comprises a circular arc having two opposite extending sides in a longitude distance and a notch formed between said two opposite extending sides of said circular arc, said notch is configured to accommodate said electrical fixture, and wherein before an user presses said two trigger portions, said notch has an original width, and wherein after said user presses said two trigger portions on said cap member, said two trigger portions are in contact with said circular arc of said conductive elastic piece forming a deformation, and a width of said notch is reduced from said original width to a reduced width due to said deformation.

2. The electrically driven toothbrush according to claim 1, wherein each of said two trigger portions is selectively formed as a pressing button, or as a knob.

3. The electrically driven toothbrush according to claim 1, wherein when said width of said notch is reduced from said original width to said reduced width due to said deformation, said two opposite extending sides of said circular arc of said second end of said conductive elastic piece touch with said electrical fixture so as to form said electrical loop, which is leading to said electrical assembly module and providing said power for turning on said electrically driven toothbrush.

4. The electrically driven toothbrush according to claim 1, wherein said electrical fixture is a securing arrangement comprising a screw and a fastener.

5. The electrically driven toothbrush according to claim 1, wherein said electrical assembly module is a printed circuit board assembly (PCBA).

6. The electrically driven toothbrush according to claim 1, wherein said seal ring is fitted on a portion of any one of said hollow handle and said cap member at an external edge of a part where said hollow handle meshes with said cap member.

7. The electrically driven toothbrush according to claim 1, wherein said seal ring is an O-shaped ring.

8. The electrically driven toothbrush according to claim 1, wherein said electrical assembly module is further provided with a plurality of slots, and said conductive elastic piece further comprises a plurality of protrusions configured on said first end, such that said electrical assembly module is fitted with said first end of said conductive elastic piece through said plurality of protrusions which are inserted or plugged into said corresponding slots of said electrical assembly module configuration.

* * * * *